United States Patent Office 2,842,523
Patented July 8, 1958

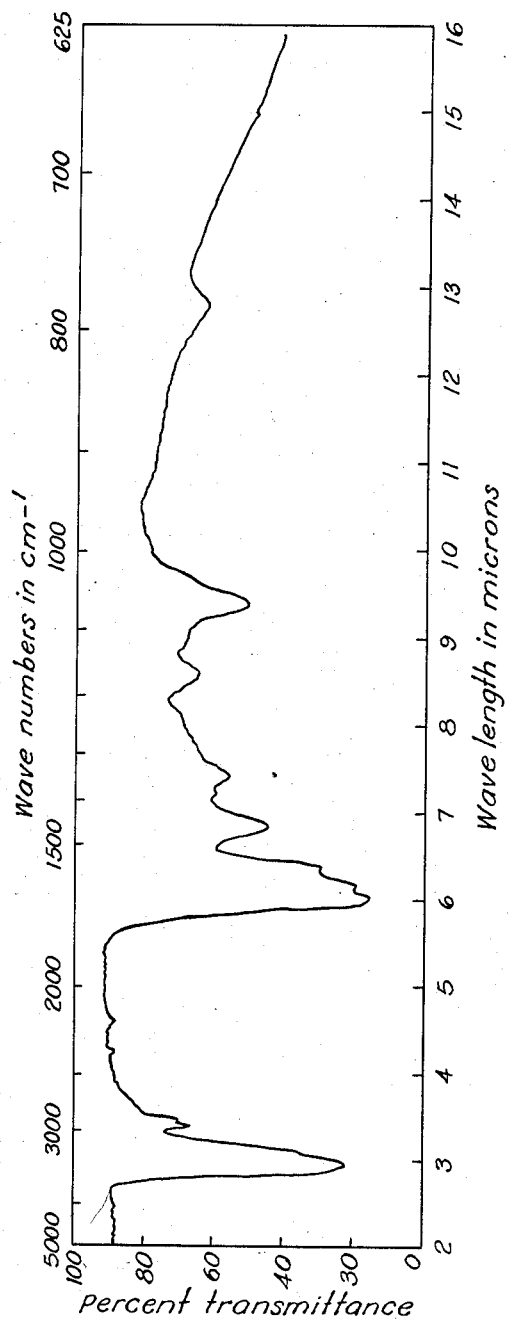

2,842,523

BETA-AMINO LOWER-ALKYL CARBAMATES AND RESINOUS REACTION PRODUCTS THEREOF

William F. Tousignant and Thomas Houtman, Jr., Midland, Mich., assignors to The Dow Chemical Company, Midland, Mich., a corporation of Delaware Application August 12, 1954, Serial No. 449,477

15 Claims. (Cl. 260—69)

This invention relates to new chemical products, to a process for their preparation, and to new products prepared therefrom.

The new products of the invention are prepared by the reaction of urea and an alkylene oxide under specialized conditions and are believed to consist preponderantly of novel beta-amino lower-alkyl carbamates having the following general formula:

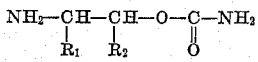

wherein $R_1$ and $R_2$ are members of the class consisting of hydrogen and lower alkyl groups of from 1 to 4 carbon atoms, the sum of the carbon atoms present in $R_1$ and $R_2$ combined being no greater than 4. Compounds in accord with the invention which correspond to the above formula are the beta-amino ethyl-, propyl-, butyl-, amyl-, and hexyl-carbamates. More particularly and preferably, the new beta-amino lower-alkyl carbamates of the invention include beta-amino ethyl carbamate and and alkyl-substituted beta-amino ethyl carbamates having from 1 to 2 alkyl groups of from 1 to 2 carbon atoms each attached directly to the ethyl radical such as beta-amino (alpha-methyl) ethyl carbamate; beta-amino (beta-methyl)ethyl carbamate; beta-amino (alpha-ethyl)ethyl carbamate; beta-amino (beta-ethyl) ethyl carbamate; beta-amino(alpha,beta-dimethyl)ethyl carbamate; beta-amino(alpha-methyl, beta-ethyl)ethyl carbamate; and beta-amino(alpha-, beta-diethyl)ethyl carbamate.

These new carbamates can be prepared by reacting an alkylene oxide with liquefied urea under conditions of good mixing at a superatmospheric pressure and at a reaction temperature in the range of about 80° to 150° C. until from 0.7 to 1.5 moles of the alkylene oxide are reacted per mole of urea. When the reaction is carried out under essentially anhydrous conditions, the alkylene oxide should be added gradually to the liquefied urea, e. g. molten urea, since on initial charging of the entire quantity of oxide reactant, the new beta-amino lower-alkyl carbamates do not form, but only thick viscous polymeric products of a type already known in the art. Under aqueous conditions, however, e. g. when water is employed as a solvent, the preparation of beta-amino lower-alkyl carbamates can be carried out either by gradually adding the alkylene oxide to a solution of urea in water or by initially charging all of the alkylene oxide, urea, and water into an autoclave, viz. by mass reaction. In either case, when water is employed as a solvent, the reaction temperature should not be allowed to rise significantly above 125° C. and is desirably maintained in the range of about 80° to 125° C.

Suitable alkylene oxides which may be employed in the preparation of beta-amino lower-alkyl carbamates in accord with the invention are those mono-olefin epoxides in which the oxygen atom is bonded to each of two contiguous carbon atoms, each oxide carbon atom having no more than one alkyl group attached thereto, preferably ethylene oxide, 1,2-propylene oxide, 1,2-butylene oxide, and 2,3-butylene oxide. Other alkylene oxides which may satisfactorily be employed in the process of the invention are certain 1,2- and 2,3- amylene and hexylene oxides, such as isopropyl ethylene oxide, α-methyl-α'-ethyl ethylene oxide, α,α'-diethyl ethylene oxide, α-methyl-α'-propyl ethylene oxide, butyl ethylene oxide, etc. These alkylene oxides are all characterized by the presence of an oxirane ring, that is, the atomic grouping

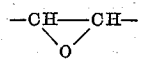

Superatmospheric pressures are absolutely essential in carrying out the processes of the invention to prepare beta-amino lower-alkyl carbamates, i. e. pressures above about 15 pounds on up to about 150 pounds per square inch gauge. At pressures lower than about 15 pounds per square inch gauge (below about 2 atmospheres) the rate of reaction between alkylene oxides and liquefied urea, e. g. molten urea, is so slow that decomposition takes place. This is accompanied by the formation of viscous polymeric products and by the evolution of considerable amounts of ammonia and carbon dioxide. Under adverse conditions, the total weight of these gases is sometimes equal in weight to that of the urea charged. This slow reaction rate between alkylene oxides and urea at pressures below 15 p. s. i. g. is probably largely due to the small solubility of alkylene oxides in liquefied urea, i. e. molten urea or urea liquefied by dissolution in hot water. Best results are usually obtained when pressures in the range of from 40 to 100 p. s. i. g. are employed.

In general, reaction temperatures should not rise significantly above 150° C., and preferably not above 140° C. under anhydrous conditions, or above 125° C. under aqueous conditions, when preparing the novel carbamates of the invention. At higher temperatures, excessive decomposition of the carbamates takes place as evidenced by the evolution of ammonia and carbon dioxide and by the formation of viscous polymeric products as previously described. When gradually adding an alkylene oxide to urea under essentially anhydrous conditions in accord with the invention, the reaction proceeds readily at or slightly above the temperature at which urea becomes molten, e. g. from about 133° C. to 140° C. Once the reaction gets under way, the urea remains liquefied in the partial reaction product and the reaction can be carried out at lower temperatures, e. g. at 90° C. When forming the carbamate under aqueous conditions, reaction temperatures in the range of from about 80° to 125° C. are satisfactory, but for best results, temperatures of from 100° to 120° C. are preferred.

As hereinbefore stated, when water is employed as a solvent, beta-amino lower-alkyl carbamates may be prepared by mass reaction upon charging the urea, water, and alkylene oxide into an autoclave and heating the well-mixed material under its autogenous pressure at a temperature at which the urea and alkylene oxide will react, but below about 125° C. Since urea is soluble in water in greater than equimolecular proportions at temperatures above 80° C., the exact proportions of urea to water do not appear to be too critical. In general, aqueous rather than anhydrous reaction conditions give less contamination of the beta-amino lower-alkyl carbamate, e. g. no monoalkanol urea by-product is formed when employing the urea in a water solution.

Ordinarily, however, beta-amino lower-alkyl carbamates are best prepared by adding the alkylene oxide in a gradual manner to liquefied urea, either under substantially moisture-free conditions or in the presence of water. Under substantially moisture-free conditions, the reaction is carried out by charging a steel reaction vessel with urea, evacuating air from the vessel and replacing it with nitrogen so as not to give rise to a dark-colored product, and then rapidly heating the urea to a temperature at which it becomes molten, viz. about 133° C. Alternatively, and more desirably, the reaction is carried out under aqueous conditions by charging urea and greater than an equimolecular proportion of water into the reaction vessel and then heating the mixture so charged under an atmosphere of nitrogen to a temperature at which the urea is substantially all dissolved, preferably above about 100° C. In either method of operation, under essentially anhydrous conditions, or in the presence of water, the alkylene oxide is then gradually introduced into the liquefied urea under conditions of good mixing until from about 0.7 up to about 1.4 or 1.5 (and more desirably from 0.85 to 1.2) molecular proportions of the alkylene oxide are reacted per molecular proportion of urea. For high conversions and yields to the beta-amino lower-alkyl carbamate, approximately equimolecular proportions of the alkylene oxide and urea are employed.

Substantially all of the alkylene oxide added to the reaction vessel ordinarily undergoes reaction with urea. Under some conditions, however, the total amount of alkylene oxide introduced into the reaction vessel may not react, e. g. if the gaseous atmosphere above the liquefied reaction zone is continuously purged with a small proportion of alkylene oxide. Consequently, the instant process for preparing beta-amino lower-alkyl carbamates is best defined in terms of the amount of urea and alkylene oxide reacted.

Since the reaction once initiated is highly exothermic, it becomes necessary to remove the heat of reaction, e. g. by indirect contact with a heat exchange liquid circulated through or around the reaction vessel. Carrying out the reaction itself in aqueous solution helps considerably in the dissipation of heat. Throughout the reaction, the pressure is desirably maintained at some predetermined value above 40 p. s. i. g., e. g. by controlling the rate of addition of the alkylene oxide. In this manner, under conditions of constant cooling, the reaction temperature may also be maintained constant. Or if desired, the pressure, and sometimes the temperature, may be maintained at or below some maximum value by means of automatic controls. Under optimum operating conditions, the pressure is ordinarily held constant at a value between about 40 and 80 p. s. i. g. Adding an alkylene oxide at a rate in the range of from about 0.1 to 0.5 pound per hour per pound of urea charged has also been found to result in high yields of the carbamate. Generally speaking the addition of alkylene oxide should be fairly rapid but not substantially greater than that at which the alkylene oxide is consumed. The slow addition of an alkylene oxide to urea unduly prolongs the duration of the run and as a consequence leads to the decomposition of the carbamate and to the formation of undesirable by-products.

After all the alkylene oxide has been added to the reaction vessel, it may be desirable to maintain the reaction mixture at a reaction temperature for a short period of time, e. g. a few minutes, to allow substantially all of the alkylene oxide to react. The reaction product is then usually devolatilized under vacuum at a temperature appreciably below 140° C. to remove trace amounts of alkylene oxide and any other low-boiling materials.

The reaction between alkylene oxides and urea in accord with the invention will proceed rapidly without the addition of substances, such as sodium or sodium hydroxide, which are commonly employed to catalyze the reaction between an alkylene oxide and a compound having one or more reactive hydrogen atoms. Such catalyzing substances have been used in the instant process, but without advantage.

Under optimum operating conditions, the yield of the total urea-alkylene oxide reaction product as taken from the reactor, i. e. "crude" carbamate, ordinarily amounts to from 90 to 95 weight percent of the materials charged. Of this, 80 to 90 percent consists of the beta-amino lower-alkyl carbamate of the invention. In addition to the carbamate, there is usually present in the reaction product a small proportion of 2-oxazolidinone or an alkyl-2-oxazoldinone, probably as a cyclicization product of the carbamate. Some unreacted urea may also be present when less than an equimolecular proportion of the alkylene oxide is employed in the reaction. When preparing the carbamate under essentially anhydrous conditions, some monoalkanol urea may also be formed. These secondary reaction products which are present in minor proportions may, for the most part, be separated from the beta-amino lower-alkyl carbamate by selective extraction with suitable organic solvents, or by fractional crystallization, or a combination of both.

Although the preparation of beta-amino lower-alkyl carbamates has thus far been described as being carried out batch-wise, these carbamate compounds may also be produced in a continuous manner, e. g. by charging a hot aqueous solution of urea and an alkylene oxide into a reaction coil under pressure and conditions of good mixing while maintaining a reaction temperature therein for a time sufficiently long to bring about the desired degree of reaction.

The new beta-amino lower-alkyl carbamates of the invention are clear, colorless, viscous, water-soluble compounds which are good plasticizers, e. g. they find utility in plasticizing phenolic adhesives and are effective softeners for cellulosic materials such as paper, cellulosic sponges, cellophane, cork etc. These new compounds have valuable humectant properties as well, being similar to glycerine in this respect, but more permanent. In may such applications, it is not necessary that the carbamate be of high purity. Instead, the substantially dry but relatively "crude" carbamate as taken from the reactor may, if desired, be employed, e. g. in the plasticization of cellulosic products, since, as hereinbefore stated, the "crude" carbamate contains up to 90 percent by weight of the beta-amino lower-alkyl carbamate.

While the products of the invention are reasonably stable, they tend in some instances, on heating or prolonged standing, to undergo slight decomposition, evolving traces of ammonia. This tendency may be offset, and the products stabilized, by adding, in the presence of water, a small amount of an aldehyde, especially strong aqueous formaldehyde, or an acid, e. g. almost any organic or inorganic acid. Organic acids such as acetic acid, oxalic acid, adipic acid, tartaric acid, and citric acid are suitable for this purpose. An inorganic acid however, especially phosphoric acid, is usually preferred and should be used in an amount sufficient to form a product having a pH at or slightly below 7. Alternatively, aqueous formaldehyde of about 36 weight percent strength is satisfactory when employed in an amount sufficient to supply about 4 percent formaldehyde based on the weight of the total "crude" carbamate. The "crude" carbamate reaction product so stailized does not alter on long-standing and is unaffected by heating even at temperatures as high as 100° C., i. e. the stabilized product is still water-soluble after heating. Even when strong aqueous formaldehyde is added in an amount equal to 45 weight percent formaldehyde based on the total "crude" carbamate, the formaldehyde-containing carbamate solution is not insolubilized by heat alone at temperatures up to about 100° C.

However, when formaldehyde, especially strong aqueous formaldehyde, is added to the "crude" carbamate in an amount sufficient to give about 30 percent and preferably 45 percent or more by weight of formaldehyde based on the "crude" carbamate, and the product so-treated then acidified, e. g. with phosphoric acid, the resultant acidified product is readily converted to a clear, brittle, water-insoluble, thermoset resin upon heating at at temperature of from about 80° to 100° C. for a time sufficiently long to evaporate the water and excess aldehyde, if any, therefrom. When an aqueous formaldehyde solution of 36 weight percent strength is employed, equal parts by weight of the "crude" carbamate and the 36 weight percent formaldehyde solution are satisfactory for subsequent resinification, i. e. by acidifying and heating to drive off the water. Preferably there are employed equal parts by weight of the 36 weight percent formaldehyde solution and the "crude" carbamate which has already been stabilized with 36 weight percent formaldehyde solution in an amount equal to about 4 percent formaldehyde based on the weight of the total "crude" carbamate. Stated in another way, greater than 0.5 and preferably about 0.8 of a molecular proportion of formaldehyde should be added to the "crude" carbamate for every molecular proportion of urea and of ethylene oxide consumed in its preparation, i. e. in the preparation of the "crude" carbamate. Excess formaldehyde is driven off upon heating. Prior to heating, however, the acidity of the formaldehyde-containing "crude" carbamate should be adjusted to a pH below 7, e. g. with phosphoric acid. A pH below 6 and preferably below about 5 is generally employed if high molecular weight resins are desired. Upon removing substantially all of the water by heating at 80° to 100° C. under atmospheric pressure, clear, brittle, water-insoluble, thermoset resins are formed. These resins are insoluble in water, both hot and cold, and can be incorporated into cellulosic products such as paper, to increase the wet strength, or cotton textiles, to impart crease resistance thereto. Since these resins intumesce upon heating, they can be advantageously used in intumescent coatings. When admixed with aqueous clay suspensions, these resins bring about the coagulation and precipitation of clay particles.

As a reactant for the foregoing purposes, there may be used not only formaldehyde itself but also the compounds yielding formaldehyde, for instance para-formaldehyde, trioxane, etc. Instead of formaldehyde there may be used other aliphatic aldehydes, such as acetaldehyde, glyoxal, acrolein, crotonic aldehyde, and the like, particularly suitable aldehydes being the aromatic or heterocyclic aldehydes, such as benzaldehyde, furfural, and the like.

The following examples illustrate but do not limit the invention.

EXAMPLE 1

An equimolecular proportion of ethylene oxide and urea were reacted at approximately 136° C. by gradually adding ethylene oxide to urea under essentially adhydrous conditions and superatmospheric pressures as hereinafter described.

A

A ten gallon water-jacketed stainless-steel reaction vessel was charged with 30 pounds (0.5 pound mole) of urea and, after replacing the air inside the vessel with an atmosphere of nitrogen, the vessel and its contents were rapidly heated to bring them to a temperature of approximately 136° C. At this temperature, the urea was molten. Thereupon ethylene oxide containing less than 0.1 weight percent water was introduced into the liquid urea under conditions of good mixing until 22 pounds (0.5 pound mole) of ethylene oxide were added during a period of about 8 hours. This represents an equimolecular reaction ratio of ethylene oxide to urea and an average feed rate of about 0.1 pound of ethylene oxide per hour per pound of urea. Throughout the reaction, the rate of introduction of ethylene oxide was regulated to maintain a pressure of from 50 to 70 pounds per square inch gauge inside the reaction vessel. When the ethylene oxide had all been added, a few minutes were allowed for post-reaction and then the vessel and its contents were rapidly cooled to 65° C. At this temperature, the vessel was gradually exhausted of gas to reduce the pressure to substantially below atmospheric, and the reaction product was again heated to 100° C. to remove trace amounts of ethylene oxide, carbon dioxide, and ammonia therefrom. Based on the reactants charged, the overall yield of the total crude organic product as taken from the reactor was approximately 92.3 weight percent. This product was a clear, colorless, viscous, water-soluble liquid smelling slightly of ammonia and having the following properties:

| | |
|---|---:|
| Specific gravity at 25° C./25° C. | 1.2695 |
| Refractive index at 25° C. | 1.5084 |
| Viscosity at 100° F. centistokes | 867 |
| Viscosity of 50% water solution at 100° F. centistokes | 2.462 |
| Viscosity of 10% water solution at 100° F. centistokes | 0.866 |
| pH of 10% water solution | 9.9 |
| Water content wt. percent | 0.94 |

B

Upon standing, crystals of monoethanol urea formed in the crude reaction product and were separated therefrom by centrifuging. The identity of the monoethanol urea was established by melting point determination and by infrared absorption analysis. By repeating this procedure several times, nearly all (approximately 10 weight percent) of the monoethanol urea was removed from the reaction product. Thereafter, the remaining product was subjected to several extractive separations with hot chloroform to remove substantially all 2-oxazolidinone, approximately 10 weight percent, from the reaction product. This extract, upon purification, was found to melt at 88–90° C. which corresponds to that given in the literature. Its identity was confirmed by infrared analysis upon comparing its infrared spectrum to that of 2-oxazolidinone prepared by reacting diethoxy carbonate with monoethanol amine. The structural formula of 2-oxazolidinone is given as follows:

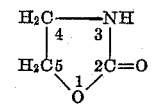

C

A portion of the product remaining after the chloroform extraction of 2-oxazolidinone was found to be soluble in pyridine and methanol at 25° C. It was also soluble in hot isopropyl-, n-butyl-, and n-amyl alcohols but substantially insoluble at 25° C. in such solvents as diethyl ether, methylethyl ketone, ethyl acetate, chloroform, carbon tetrachloride, propylene dichloride, n-heptane, petroleum ethers, cyclohexane, benzene, toluene, xylene, etc. Upon subjecting another portion of this product to chemical analysis, it was found to have the following composition in percent by weight.

| | Percent |
|---|---|
| Carbon | 33.18. |
| Nitrogen | 26.20. |
| Hydrogen | 7.09. |
| Oxygen | 33.53 (by difference). |

As determined by boiling point elevation in methanol, the molecular weight was found to be 105. From the above data was calculated the following empirical formula:

A sample of this material was then analyzed by standard infrared methods and found to have the infrared absorption spectrum illustrated in the drawing. As therein shown, certain charactereristic carbamate absorption bands appear at the following wave length in microns:

2.98μ strong band due to N—H stretching frequency
6.02μ strong band due to C=O stretching frequency
6.17μ medium strong band, possibly due to N—H deformation
6.38μ medium strong band, possibly due to N—H deformation Other characteristic absorption bands were observed as follows:

6.88μ medium band
8.62μ medium-weak band (possibly due to urea)
9.4μ broad, medium band
7.43μ broad, weak band From a study of the foregoing data together with certain other analytical data and chemical tests, it appears reasonably certain that the major product of the reaction is beta-amino-ethyl carbamate as represented by the following structural formula:

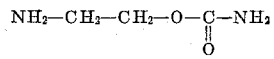

The benzoate derivative, prepared by the Schotten-Baumann method, melted at approximately 206° to 207° C.

D

In contrast to the above-described reaction carried out in accord with the invention by gradually adding ethylene oxide to urea under essentially anhydrous conditions, an anhydrous mass reaction (not according to the invention) was conducted by charging ethylene oxide and urea into an autoclave and heating them under the autogenous pressure as hereinafter described. Into a 1.5 liter capacity rotating-type steel autoclave cooled to below 10° C. was added 60 grams (1.0 mole) urea and 46 grams (1.05 moles) of liquid ethylene oxide containing less than 0.1 weight percent water. The autoclave was sealed and its charge heated in about 10 minutes time to 135° C. The pressure in the autoclave rose to 125 p. s. i. g. After holding the temperature at 135° C. for 20 minutes, the autoclave was cooled slightly and maintained for 1.5 hours in the temperature range of 115° to 126° C. Within this temperature range the autogenous pressure was about 75 p. s. i. g. Thereafter the autoclave was cooled to about 20° C., the gauge pressure dropping off to about zero. Unlike the reaction conducted in accord with the invention, in this procedure the lid of the autoclave was coated with a heavy layer of ammonium carbonate and the organic product was a soft, brown, resinous material, the infrared absorption spectrum of which did not resemble the infrared absorption spectrum of the beta-amino-ethyl carbamate.

EXAMPLE 2

A number of runs were carried out according to the general procedure of Example 1 by gradually reacting ethylene oxide and urea under essentially anhydrous conditions in a mole ratio of approximately 0.85 to 1. In each of these runs, a 50 gallon water-jacketed nickel reaction vessel was employed. This was charged with 120 pounds (2.0 pound moles) of urea, blanketed with nitrogen, and heated to approximately 135° C. whereupon ethylene oxide was gradually added to the urea under conditions of good mixing and at a constant rate of feed until 75 pounds (1.7 pound moles) were introduced. Throughout the addition of ethylene oxide, the pressure was maintained substantially constant by means of a pressure relief valve set to maintain the pressure below some maximum value together with a nitrogen supply valve set to maintain the pressure above some minimum value, said maximum and minimum values very closely approximating each other. A series of runs was carried out with the pressure in each maintained at a different value in the range from 20 to 80 pounds per square inch gauge. Likewise the rate of feed of ethylene oxide, although constant throughout each run, was varied considerably from run to run in the range from 0.15 to 0.63 pound ethylene oxide per hour per pound of urea charged. In each run, when the addition of ethylene oxide was complete, the product was devolatilized, as described in the previous example, and removed from the reactor.

Table I contains the pertinent data for each run. In column 1 is given the ethylene oxide feed rate in pounds of ethylene oxide per hour per pound of urea charged. Columns 2 and 3 give respectively the pressure of the various runs in pounds per square inch gauge and also the temperature in degrees centigrade. The percent overall yield of organic product based on the weight of reactants charged is given in column 4. The next two columns, viz. 5 and 6, list the specific gravities at 25° C./25° C. and refractive indices at 25° C. for the various runs. Column 7 gives the viscosities of the undiluted organic products as taken from the reactor and also the viscosities of 50 percent and 10 percent water solutions thereof. Columns 8 and 9 give respectively the weight percent water content of the organic products of the several runs and the hydrogen ion concentrations (pH) of a 10 percent water solution of the product of each run.

*Table I*

| Feed Rate of E. O., Lbs. E. O./Hr./Lbs. Urea | Pressure, p. s. i. g. | Temperature, ° C. | Product Yield, Wt. Percent | Specific Gravity, 25° C./25° C. | Refractive Index, 25° C. | Viscosity at 100° F. | | | Percent H₂O | pH |
|---|---|---|---|---|---|---|---|---|---|---|
| | | | | | | 100% | 50% | 10% | | |
| 0.164 | 20 | 138 | 90.9 | 1.2965 | 1.5074 | 0.843 | 2.18 | 628 | .80 | 9.71 |
| 0.140 | 40 | 130 | 90.0 | 1.2827 | 1.5074 | 0.855 | 2.34 | 794 | .589 | 9.68 |
| 0.150 | 60 | 133 | 94.5 | 1.2807 | 1.5080 | 0.864 | 2.40 | 846 | .705 | 9.70 |
| 0.250 | 20 | 135 | 84.0 | 1.2877 | 1.5080 | 0.845 | 2.09 | 548 | .981 | 9.79 |
| 0.238 | 40 | 137 | 90.4 | 1.2787 | 1.5068 | 0.848 | 2.17 | 630 | .824 | 9.68 |
| 0.247 | 60 | 138 | 93.2 | 1.2783 | 1.5070 | 0.866 | 2.36 | 656 | 1.90 | 9.82 |
| 0.267 | 70 | 137 | 97.3 | 1.2750 | 1.5065 | 0.876 | 2.34 | 677 | 1.43 | 10.0 |
| 0.450 | 20 | 137 | 80.0 | Solid | 1.5089 | Solid | | | .278 | 9.91 |
| 0.444 | 40 | 136 | 88.3 | 1.2850 | 1.5063 | 0.891 | 2.18 | 510 | .833 | 9.85 |
| 0.450 | 60 | 139 | 93.6 | 1.2860 | 1.5070 | 0.864 | 2.46 | 606 | .595 | 9.81 |
| 0.407 | 80 | 138 | 93.9 | 1.2754 | 1.5069 | 0.859 | 2.27 | 596.8 | .952 | 9.79 |
| 0.630 | 80 | 140 | 91.0 | 1.2790 | 1.5069 | 0.854 | 2.29 | 572 | .622 | 9.90 |

EXAMPLE 3

The reaction of ethylene oxide with urea was carried out in the presence of water by gradually adding ethylene oxide under pressure to an aqueous solution of urea as described below.

A

A ten gallon stainless steel reaction vessel was charged with 18.5 pounds of (0.30 pound mole) of urea and 9.2 pounds (0.50 pound mole) of water and flushed with nitrogen gas to expel the air. The reaction vessel so charged was then heated to 110° C. and 11.5 pounds (0.26 pound mole) of ethylene oxide was gradually added to the aqueous solution of urea under conditions of good mixing during a period of 5 hours. Throughout the addition of ethylene oxide, the pressure was maintained in the range of from 34 to 47 p. s. i. g. and the temperature, from 110° C. to 115° C. Following the reaction, the water was distilled away from the organic product under reduced pressure. The total organic product so obtained was found by infrared absorption analysis to be very similar in composition to that produced in accord with the invention by the procedure of Example 1 and to consist of chiefly of beta-amino-ethyl carbamate. A small amount of urea and 2-oxazolidinone were also identified in the product. No monoethanolamine was found to be present by infrared absorption analysis.

B

When ethylene oxide was reacted with urea by gradually adding ethylene oxide to a water-solution of urea in the same proportions by weight and in the same reaction vessel according to the above-described procedure but at a slightly lower temperature, viz. approximately 90° C., a considerable amount of urea was recovered unreacted. The organic reaction product consisted preponderantly of beta-amino-ethyl carbamate and contained, in addition thereto, small amounts of 2-oxazolidinone, urea, and ethylene glycol.

C

In contrast to the above runs, ethylene oxide was gradually added to an aqueous solution of urea in the same manner as described above but at 135° C. (not according to the invention). Excessive decomposition occurred together with extensive build up of pressure in the reaction vessel so that the addition of ethylene oxide had to be discontinued.

EXAMPLE 4

The mass reaction of ethylene oxide with urea was carried out in water solution by charging ethylene oxide, urea, and water into an autoclave and heating at a reaction temperature under the autogenous pressure developed in the autoclave as described below.

A

Into a 1.5 liter rotating-type steel autoclave cooled to below 10° C. was charged 60 grams (1.0 mole) urea, 30 grams (1.6 moles) of water, and 46 grams (1.05 moles) of liquid ethylene oxide. The autoclave and its charge was then heated under its autogenous pressure to 90° C. in about 10 minutes time. Heating was continued for about 4 hours during which time the temperature was maintained substantially constant at 90° C. At the end of the reaction period, the water was distilled away from the organic product under reduced pressure. The organic reaction production was found to consist preponderantly of beta-amino-ethyl carbamate by infrared absorption analysis.

B

In contrast to the previous run, ethylene oxide, urea, and water were charged into the above-described autoclave and reacted at 135° C. (not according to the invention) for 2 hours according to the same general procedure employed above. The organic product was a soft, brown, resinous material, the infrared absorption spectrum of which did not resemble the infrared absorption spectrum of the beta-amino-ethyl carbamate. Small amounts of 2-oxazolidinone and ethylene glycol were present but no beta-amino-ethyl carbamate was found.

EXAMPLE 5

Substantially anhydrous 1,2-propylene oxide and urea were reacted in equimolecular proportions by gradually adding the former to the latter as described below.

A dry 10-gallon water-jacketed stainless steel reaction vessel was charged with 9.0 pounds (0.15 pound mole) of urea, flushed with nitrogen gas, and heated to about 135° C. The nitrogen gas in the reactor was then vented to drop the pressure to atmospheric and 1,2-propylene oxide containing less than 0.2 weight percent of water was gradually added to the liquid urea under conditions of good mixing until 8.7 pounds (0.15 pound mole) of 1,2-propylene oxide had been added in a period of about 1.75 hours. Throughout the run, the pressure and temperature were maintained in the ranges of from 50 to 60 p. s. i. g. and from 134° to 139° C. respectively. Following the addition of 1,2-propylene oxide, the temperature was maintained at about 135° C. for a short post-reaction period. The reaction vessel and its contents were then cooled to 50° C., at which temperature the pressure inside the reactor had fallen to 10 p. s. i. g. Thereupon the pressure was slowly reduced to about 40 millimeters of mercury absolute and the reaction product devolatilized, first at 50° C. and finally at 80° C. The reaction vessel was then cooled to about 20° C. and the organic product removed. It consisted of a clear, viscous, water-soluble, liquid and was produced in a yield of 91.6 weight percent. By infrared absorption analysis, the organic product was found to consist preponderantly of beta - amino, methyl - ethyl carbamate (probably beta-amino, alpha-methyl-ethyl carbamate), and to contain approximately 20 percent methyl-2-oxazolidinone (probably 5-methyl-2-oxazolidinone) and 10 percent monoisopropanol urea.

EXAMPLE 6

A mixture of butylene oxides consisting of 90 percent 1,2-butylene oxide and 10 percent 2,3-butylene oxide was gradually reacted with urea under essentially anhydrous conditions in accord with the procedure of the preceding example except as hereinafter specifically stated.

Approximately 10.8 pounds (0.15 pound mole) of mixed butylene oxides was gradually added during a period of 3 hours to 9.0 pounds (0.15 pound mole) of urea maintained at a temperature in the range of 136° to 140° C. and at a pressure of from 37 to 40 p. s. i. g. Following the reaction, devolatilization of the reaction product was carried out at a temperature up to 100° C. under a reduced pressure of 40 millimeters of mercury absolute. The organic product, recovered in a yield of 87 weight percent, was a clear viscous water-soluble liquid. It was found by infrared absorption analysis to consist preponderantly of beta-amino, ethyl-ethyl carbamate (probably the beta-amino-alpha-ethyl-ethyl carbamate) and to contain approximately 30 percent ethyl-2-oxazolidinone (probably 5-ethyl-2-oxazolidinone) and 10 percent butanol urea.

EXAMPLE 7

The beta-amino lower-alkyl carbamate products of the invention are shown to be good softening agents for paper as hereinafter described.

To the total organic product prepared as described in Example 1A consisting preponderantly of beta-amino ethyl carbamate was added an aqueous solution of 36 weight percent formaldehyde in an amount sufficient to give a formaldehyde concentration of about 4 percent by weight of the total product. This formaldehyde-containing product (A) was then impregnated on test strips of a 27 pound weight vegetable parchment paper obtained from the Kalamazoo Vegetable Parchment Company to determine its softening action and permanence as compared with glycerine (G).

This softening action was determined on 1.5 x 2 inch strips of test paper conditioned at 73° F. and at 50 percent relative humidity for at least 24 hours prior to impregnation. The paper test strips were weighed, dipped in a water solution of the softener, and then put through rollers to remove excess liquid. The strengths of the aqueous softener solutions were varied to give different concentrations of the softening agent in the test strips. After impregnation, the strips were dried in a drying frame for 15 minutes at 176° F. and then again conditioned for at least 24 hours at 73° F. and 50 percent relative humidity. Thereafter the weight percent pickup was determined for each test strip, and test strips having similar concentrations of the two softening agents were measured for stiffness on a conventional Gurley Stiffness Tester. A decrease in stiffness was taken as a softening effect. The formaldehyde-containing beta-amino-ethyl carbamate product (A) was found to be somewhat more effective in softening the test strips than glycerine (G) as shown in the following table which gives the percent decrease in stiffness as compared to blank strips of unimpregnated paper.

| Concentration of Softening Agent | Decrease in Stiffness | |
|---|---|---|
| | A | G |
| | Percent | Percent |
| 20 wt. percent | 27.8 | 25.4 |
| 40 wt. percent | 48.6 | 31.2 |

A slight stiffening effect, viz. 5.8 percent, was observed when a test strip of the same paper containing 20 weight percent 2-oxazolidinone was similarly tested.

That the beta-amino-ethyl carbamate product (A) of the invention is considerably more permanent, i. e. less fugitive, in paper than glycerine (G) is shown by the following accelerated aging tests using test strips of the above-described vegetable parchment paper containing 45 percent of the softening agent. After conditioning at constant temperature and humidity, the test strips were weighed, placed in a vented oven, and maintained at 135° F. for fourteen days. At the end of this time, the formaldehyde-containing beta-amino-carbamate product (A) strips were again conditioned and weighed and found to have a retention (residual concentration of softener) of 38 percent as compared to only 12 percent for the glycerine impregnated (G) strips. The percent stiffness reduction was determined by the Gurley Stiffness Tester just prior to and again immediately after fourteen days of accelerated aging at 135° F. The initial stiffness reduction of the carbamate-impregnated (A) and glycerine-impregnated (G) strips were very similar, being 58.4 percent and 57.7 percent respectively. After fourteen days, however, the stiffness reduction of the carbamate-impregnated (A) strips was 58.2 percent, i. e. almost as good as initially, while the stiffness reduction of the glycerine-impregnated (G) strips had fallen off to only 34.2 percent.

Beta-amino propyl- and butyl-carbamate reaction products similar to those described in Examples 5 and 6 and stabilized with approximately 4 percent by weight of formaldehyde were tested on the Gurley Stiffness Tester and found to be good softening agents for paper, possessing almost the same degree of effectiveness as the above-described formaldehyde-containing beta-amino-ethyl carbamate product (A). When incorporated in paper as softening agents, these products, similar to A above, were observed to have a high degree of permanence.

EXAMPLE 8

The beta-amino-ethyl carbamate products of the invention are comparable to or slightly more effective than glycerine in softening cellophane, and in addition, do not reduce the tensile strength nearly as much as glycerine, as hereinafter described.

A Scott X-5 tensile machine was used to determine tensile strengths at various elongations of cellophane test films dip-treated to contain in one series 10, 20, and 30 percent by weight of the formaldehyde containing beta-amino-ethyl carbamate product (A) employed in Example 7 and in another series, like proportions of glycerine (G). For purpose of comparison, a cellophane test film dipped only in a water bath was run as a control. Prior to testing, all cellophane test films were conditioned at 50 percent relative humidity at 75° F. for at least 48 hours. The tensile strength values of the test films in kilograms per square centimeter at various percent elongations are given in Table II.

Table II.—Tensile values are in kg./cm.$^2$

| Percent Elongation | 4 percent | 8 percent | 12 percent | 16 percent |
|---|---|---|---|---|
| H$_2$O Treated Control | 910 | 1,049 | 1,180 | 1,297 |
| 10% A | 651 | 747 | 840 | |
| 20% A | 501 | 603 | 712 | 827 |
| 30% A | 387 | 480 | 576 | 675 |
| 10% G | 563 | 677 | 773 | |
| 20% G | 413 | 507 | 613 | 701 |
| 30% G | 341 | 435 | 525 | 605 |

EXAMPLE 9

The preparation of a clear brittle water-insoluble thermoset resin from one of the beta-amino-ethyl carbamate products of the invention is described below.

To the total organic product prepared as described in Example 1 A consisting preponderantly of beta-amino-ethyl carbamate was added 36 weight percent aqueous formaldehyde to give a formaldehyde concentration of 20 percent based on the weight of the total resultant solution. This was then acidified with the addition of 85 percent H$_3$PO$_4$ until a pH of about 4.5 to 5.0 was obtained. Upon analysis, the clear colorless acidified solution was found to have a solids content of about 66 to 67 weight percent. This solution was heated to 80° to 90° C. until substantially all of the water was removed. The resultant thermoset resin was a clear colorless brittle water-insoluble solid having the following thermal properties:

° C.
Softening range _____ 160–180
Melting range _____ 180–190
Decomposition temperature _____ 215

EXAMPLE 10

The casing of clear, brittle, water-insoluble thermoset films from the beta-amino lower alkyl carbamate products of the invention is hereinafter described.

To 100 parts by weight of each of the total organic products prepared as described in Examples 1 A, 5, and 6 consisting preponderantly of the beta-amino ethyl-, propyl-, and butyl-carbamates, respectively, was added 260 parts by weight of 36 weight percent aqueous formaldehyde solution and 5.33, 4.4, and 3.0 parts by weight, respectively, of 85 percent phosphoric acid. These solutions, having pH values of 6.5, 6.0, and 5.0, respectively, were cast into films on glass slides and heated for 30 minutes at 100° C. in an air oven. All of the resultant films were clear, brittle, and insoluble in cold water. In addition, the film prepared from the product containing the beta-amino-ethyl carbamate was colorless and insoluble in boiling water. That prepared from the product containing the beta-amino-propyl carbamate was light amber in color and partially soluble in boiling water. The film prepared from the product containing the beta-amino-butyl carbamate was light yellow in color, dissolving slightly in boiling water to give a white opaque solid.

That which is claimed is:

1. A beta-amino lower-alkyl carbamate selected from the class consisting of beta-amino-ethyl carbamate and beta-amino-ethyl carbamates having from 1 to 2 alkyl groups of from 1 to 2 carbon atoms each attached directly to the ethyl radical.

2. Beta-amino-ethyl carbamate.

3. A beta-amino-propyl carbamate.

4. Beta-amino-alpha-methylethyl carbamate.

5. A beta-amino-butyl carbamate.

6. A beta-amino-ethylethyl carbamate.

7. The process of preparing viscous water-soluble condensation products which comprises gradually adding a monoolefin epoxide having no more than one alkyl group attached to each oxide carbon atom to a reaction vessel containing liquefied urea, maintaining a superatmospheric pressure above about 15 pounds per square inch gauge and a reaction temperature in the range of from 80° to 150° C. with the further limitation that the temperature not exceed 125° C. when the reaction medium is aqueous, and continuing said addition of the mono-olefin epoxide until from about 0.7 to 1.5 moles have been reacted per mole of urea.

8. The process of preparing viscous water-soluble condensation products useful for softening cellulosic products which comprises gradually adding to and thoroughly mixing with liquefied urea maintained in a reaction vessel at a reaction temperature below 140° C. and at a pressure of 40 to 100 pounds per square inch gauge, a substantially anhydrous alkylene oxide of the class consisting of ethylene oxide, 1,2-propylene oxide, 1,2-butylene oxide, and 2,3-butylene oxide at a rate in the range of from about 0.1 to 0.5 pound per hour per pound of urea charged until from 0.85 to 1.2 molecular proportions of alkylene oxide have been reacted per molecular proportion of urea.

9. The process of preparing viscous water-soluble condensation products consisting preponderantly of beta-amino-ethyl carbamate which comprises gradually adding substantially moisture-free ethylene oxide to and thoroughly mixing it with liquefied urea in a reaction vessel at a reaction temperature below about 140° C. and at pressure in the range of from 40 to 80 pounds per square inch gauge until from 0.7 to 1.5 molecular proportions of ethylene oxide have been reacted per molecular proportion of urea and thereafter separating beta-amino-ethyl carbamate therefrom.

10. The method which comprises gradually introducing ethylene oxide into a pressure vessel in contact with liquefied urea, said introduction being made at a rate to achieve and maintain a pressure of from 15 to 100 pounds per square inch gauge during the reaction period, the reaction zone being maintained at a temperature in the range of from 80° to 150° C. with the further limitation that the temperature not exceed 125° C. when the reaction medium is aqueous, and continuing said introduction of ethylene oxide until from 0.7 to 1.5 molecular proportions of ethylene oxide have been so introduced per molecular proportion of urea.

11. A clear brittle water-insoluble thermoset resin formed from the total organic product of claim 10 by preparing an aqueous formaldehyde solution thereof containing approximately 45 percent by weight of formaldehyde based on the weight of the urea-ethylene oxide reaction product dissolved therein, acidifying the resultant solution to a pH below about 6 with phosphoric acid, and heating the solution so acidified at a temperature of from about 80° to 100° C. for a time sufficiently long to remove substantially all of the water therefrom.

12. The method according to claim 10 wherein the total reaction product is heated under reduced pressure for a time sufficiently long to remove substantially all water and lower boiling components therefrom.

13. The method of preparing a clear brittle water-insoluble resin which comprises gradually introducing an alkylene oxide of the class consisting of ethylene oxide, 1,2-propylene oxide, 1,2-butylene oxide, and 2,3-butylene oxide into a pressure vessel in contact with liquefied urea, said introduction being made at a rate to achieve and maintain a pressure of from 15 to 100 pounds per square inch gauge and a reaction temperature in the range of from 80° to 150° C. with the further limitation that the temperature not exceed 125° C. when the reaction medium is aqueous, until from 0.7 to 1.5 molecular proportions of alkylene oxide have been introduced per molecular proportion of urea, and thereafter preparing an aqueous formaldehyde solution thereof containing at least 30 percent formaldehyde based on the weight of the organic urea-alkylene oxide reaction product dissolved therein, acidifying the resultant solution, and heating the solution so acidified at a temperature of from about 80° to 100° C. for a time sufficiently long to remove substantially all of the water therefrom.

14. A resin prepared according to the method of claim 13.

15. A clear brittle water-insoluble thermoset resin formed by preparing an aqueous formaldehyde-containing solution consisting preponderantly of beta-amino-ethyl carbamate having a formaldehyde content of approximately 45 percent based on the weight of the beta-amino-ethyl carbamate, acidifying said solution to a pH below about 6 with phosphoric acid, and heating the solution so acidified at a temperature of from about 80° to 100° C. for a time sufficiently long to remove substantially all of the water therefrom.

References Cited in the file of this patent

UNITED STATES PATENTS

| | | |
|---|---|---|
| 1,894,162 | Dalmer et al. | Jan. 10, 1933 |
| 1,924,253 | Paquin | Aug. 29, 1933 |
| 2,123,718 | DeGroote | July 12, 1938 |
| 2,155,328 | Paquin | Apr. 18, 1939 |
| 2,220,147 | Dreyfus | Nov. 5, 1940 |

FOREIGN PATENTS

| | | |
|---|---|---|
| 68,165 | Norway | July 31, 1944 |

OTHER REFERENCES

Beilstein, Bond 4, page 253, Springer, Berlin (1922).